(12) United States Patent
Belsare et al.

(10) Patent No.: US 12,328,794 B1
(45) Date of Patent: Jun. 10, 2025

(54) MODIFY ACCESS BEARER REQUEST (MABR) MESSAGING WITH REDUCED SIGNALING

(71) Applicant: Cisco Technology, Inc., San Jose, CA (US)

(72) Inventors: Suyog Subhash Belsare, Maharashtra (IN); Pravin Appaji Ajagekar, Pune (IN); Ravi Shankar Mantha, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 17/868,272

(22) Filed: Jul. 19, 2022

(51) Int. Cl.
*H04W 8/18* (2009.01)

(52) U.S. Cl.
CPC .................... *H04W 8/183* (2013.01)

(58) Field of Classification Search
CPC .................................... H04W 8/183
See application file for complete search history.

(56) References Cited

U.S. PATENT DOCUMENTS

| | | | |
|---|---|---|---|
| 2010/0260141 A1* | 10/2010 | Chowdhury | H04W 60/04 370/331 |
| 2010/0272115 A1 | 10/2010 | Ramankutty | |
| 2011/0019624 A1 | 1/2011 | Lu et al. | |
| 2016/0007316 A1* | 1/2016 | Vaidya | H04W 64/003 370/312 |
| 2018/0302943 A1 | 10/2018 | Wang et al. | |
| 2018/0375900 A1* | 12/2018 | Verma | H04W 4/02 |
| 2019/0104563 A1* | 4/2019 | Olsson | H04W 76/32 |
| 2019/0110186 A1 | 4/2019 | Dong et al. | |
| 2019/0182873 A1* | 6/2019 | Wass | H04W 60/00 |
| 2019/0274076 A1* | 9/2019 | Kim | H04W 24/10 |
| 2021/0260141 A1 | 8/2021 | Brodie et al. | |

* cited by examiner

*Primary Examiner* — Barry W Taylor (74) *Attorney, Agent, or Firm* — Polsinelli P.C.

(57) ABSTRACT

The present disclosure is directed to systems and techniques for providing signaling optimization for Modify Access Bearer Request (MABR) messaging in a network. In one example, the systems and techniques can include negotiating, using a Mobility Management Engine (MME), a MABR support for the MME to include subscriber information in one or more MABR messages transmitted by the MME. The MME can determine an updated subscriber information, wherein the updated subscriber information is determined based on a User Equipment (UE) location change. Based at least in part on the negotiated MABR support, and in response to the MME determining the updated subscriber information, the MME can transmit a single MABR to a Serving Gateway (SGW), wherein the single MABR message includes the updated subscriber information.

20 Claims, 5 Drawing Sheets

MODIFY ACCESS BEARER REQUEST (MABR) MESSAGING WITH REDUCED SIGNALING

TECHNICAL FIELD

The present technology pertains to wireless networks, and more particularly to providing signaling optimization for Modify Access Bearer Request (MABR) messaging in a network.

BACKGROUND

A packet data network gateway (PGW) is a network function that can be used to provide an interface between a first packet data network (PDN) and one or more additional PDNs. A given PDN may include one or more PGWs that are used to provide an interface between the given PDN and external PDNs. For example, a 4G/LTE mobile core network (e.g., evolved packet core (EPC)) can include one or more PGWs as an interface between the 4G/LTE network and an external PDN, such as the Internet. Control and user plane separation can be applied to a PDN and/or a PGW, in which case a PGW-U serves as the user data plane ingress and egress point to the EPC and a PGW-C serves to manage control plane signaling and functionality. When a subscriber establishes an Evolved Packet System (EPS) bearer to a given PDN, the PGW-U under control of the PGW-C can serve as the point of attachment to that PDN for the life of the EPS bearer. In some examples, packet inspection may be an important role of the PGW-U, for example to ensure that data has the appropriate service level applied.

A PGW-U can be used to implement or otherwise provide one or more location-based services to the PDN with which the PGW-U is associated. For example, location-based services provided by the PGW-U can include Event Data Record (EDR) services, Traffic Optimization (TO) services, etc. EDR and TO information and/or services can be used to perform analytics, monetization, optimization, etc. Location-based services provided on the user plane (e.g., provided by the PGW-U) may be based on or otherwise utilize subscriber information. In some cases, location-based PGW-U services may require current or up-to-date information about a subscriber, as such subscriber information can change over time.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Aspects of the present disclosure are directed to providing signaling optimization for Modify Access Bearer Request (MABR) messaging in one or more networks. For example, the systems and techniques described herein can be implemented in a 4G cellular network core (e.g., Evolved Packet Core (EPC)), a 5G cellular network core (e.g., 5G Core (5GC)), etc., to enable MABR support at (or for) a Mobility Management Engine (MME). In some aspects, the systems and techniques can enable MABR support for MME signaling that includes UE or subscriber information. As will be described in greater depth below, UE or subscriber information can include, but is not limited to, one or more of UE location information, user Closed Subscriber Group (CSG) information, UE Time Zone (TZ) information, and/or presence reporting area information. In some aspects, the systems and techniques can enable MABR support for MME signaling that includes some or all of the aforementioned UE or subscriber information, wherein the MME provides the UE or subscriber information to at least a Packet Data Network (PDN) Gateway (e.g., PDN Gateway or PGW).

A method can include negotiating, using a Mobility Management Engine (MME), a Modify Access Bearer Request (MABR) support for the MME to include User Location Information (ULI) in one or more MABR messages transmitted by the MME; determining, using the MME, an updated ULI, wherein the updated ULI is determined based on a User Equipment (UE) location change; and based at least in part on the negotiated MABR support, and in response to the MME determining the updated ULI, transmitting a single MABR message from the MME to a Serving Gateway (SGW), wherein the single MABR message includes the updated ULI.

In some embodiments of the method, the method further comprises determining a negotiated ULI interest associated with a Packet Gateway (PGW); and in response to determining that the negotiated ULI interest exists, forwarding the updated ULI from the SGW to the PGW using one or more Modify Bearer Request (MBR) messages.

In some embodiments of the method, the negotiated ULI interest associated with the PGW is determined for each respective Packet Data Network (PDN) of two or more PDNs associated with the PGW.

In some embodiments of the method, he negotiated ULI interest is determined based on an Indication Information Element (IE) flag associated with the PGW.

In some embodiments of the method, the negotiated ULI interest is negotiated between the SGW and the PGW, based at least in part on the inclusion of the Indication IE flag in an Update Bearer Request message.

In some embodiments of the method, the negotiated MABR support is negotiated between the MME and the SGW, the SGW and the MME included in a same wireless network.

In some embodiments of the method, the MME includes the ULI in the single MABR message transmitted to the SGW, wherein the single MABR message is associated with two or more Packet Data Networks (PDNs).

In some embodiments of the method, the SGW and the MME are included in a 5G Non-Standalone (NSA) network, the 5G NSA network including a fourth-generation (4G) Evolved Packet Core (EPC) and a fifth-generation (5G) Core (5GC).

In some embodiments of the method, the ULI and the updated ULI are associated with a 5G NSA User Equipment (UE).

In some embodiments of the method, the updated ULI is determined based on a UE location change associated with a UE state change between idle and active or a UE location change associated with an inter-eNodeB handover.

A system can include one or more processors and at least one computer-readable storage medium having instructions stored thereon, wherein the instructions, when executed by the one or more processors, are effective to cause the one or more processors to: negotiate, using a Mobility Management Engine (MME), a Modify Access Bearer Request (MABR) support for the MME to include User Location Information (ULI) in one or more MABR messages transmitted by the MME; determine, using the MME, an updated ULI, wherein the updated ULI is determined based on a User Equipment (UE) location change; and based at least in part on the negotiated MABR support, and in response to the MME determining the updated ULI, transmit a single MABR message from the MME to a Serving Gateway (SGW), wherein the single MABR message includes the updated ULI.

A non-transitory computer-readable storage medium can include instructions stored thereon, wherein the instructions, when executed by a processor, are effective to cause the processor to: negotiate, using a Mobility Management Engine (MME), a Modify Access Bearer Request (MABR) support for the MME to include User Location Information (ULI) in one or more MABR messages transmitted by the MME; determine, using the MME, an updated ULI, wherein the updated ULI is determined based on a User Equipment (UE) location change; and based at least in part on the negotiated MABR support, and in response to the MME determining the updated ULI, transmit a single MABR message from the MME to a Serving Gateway (SGW), wherein the single MABR message includes the updated ULI.

Example Embodiments

Serving Gateways (SGWs) are data plane elements that can route and forward user data packets, while also acting as a mobility anchor for the user plane during inter-eNodeB handovers. SGWs can additionally, or alternatively, act as an anchor for mobility between LTE and other 3GPP technologies (e.g., 5G, etc.). Packet Data Network (PDN) Gateways (PGWs) may provide UE IP-connectivity access network (IP-CAN) session connectivity to one or more external packet data networks (PDNs), such as, for example, the Internet. In other words, a PGW can be provided as a network function that interfaces between a first PDN and one or more additional (e.g., external) PDNs. A given PDN may include one or more PGWs that are used to provide an interface between the given PDN and external PDNs. For example, a 4G/LTE mobile core network (e.g., evolved packet core (EPC)) can include one or more PGWs as an interface between the 4G/LTE network and an external PDN (e.g., such as the Internet or Session Initiation Protocol (SIP)-based IP Multimedia Subsystem (IMS) networks, among others). A 5G mobile core network (e.g., 5G Core (5GC)) can include one or more PGWs as an interface between the 5G network and an external PDN such as the Internet. The PGW can also serve as a policy enforcement point to manage Quality of Service (QOS), online/offline flow-based charging, data generation, deep-packet inspection, and/or lawful intercept, etc.

As will be described in greater depth below, various signaling messages may be exchanged between the Mobility Management Engine (MME) of a cellular network and an SGW and/or PGW of the cellular network, including one or more signaling messages that are generated and transmitted in response to a UE mobility event, IDLE-Active movement, X1/S2 handover, etc. For example, with the introduction of Non-Standalone (NSA) 5G devices-which connect to a 5G Radio Access Network (RAN) and a 4G/LTE Evolved Packet Core (EPC)—a significant increase in signaling messages has been observed due to devices (e.g., UEs) sending a Modify Bearer Request (MBR or MBReq) for each connected Packet Data Network (PDN).

A PDN connection (also referred to as a PDU session) is an association between the UE and a data network (e.g., PDN), such as the Internet. Bearers are the tunnels used to connect a UE to a PDN. An MBR message is used to modify the bearer context for a UE's PDN connection. For example, the bearer context for a UE's PDN connection can be modified when the UE undergoes a movement or state change (e.g., IDLE-Active movement), undergoes a handover (e.g., X1/S2 handover), etc.

MABR (Modify Access Bearer Request) is an optional method supported on the MME/SGW and primarily intended for use with the access bearers for all of the PDN connections of a UE. A MABR message is a UE-level message that can be used to consolidate multiple MBR messages that would otherwise have been transmitted (e.g., a single MABR message can replace two or more MBR messages, when the MABR procedure is enabled/supported). However, the existing 3GPP specification restricts MABR support on the MME, and in particular, restricts the MME from sending the UE's location and/or user CSG (Closed Subscriber Group) information and/or UE time zone and/or Presence Reporting Area information to the PDN gateway (e.g., PGW).

This restriction can present a problem for network operators who obtain UE location/time zone information piggybacked with MME signaling. For example, in the context of 5G NSA devices, the 3GPP implementation of MABR may not be supported during the IDLE-Active transition of a 5G NSA device. For example, when a 5G NSA UE is idle and then becomes active, the user session is first established with the 4G UTRAN location before subsequently being moved to the 5G NR location. This results in the MME sending an MBR message for each connected PDN for every IDLE-Active movement (and the same also applies to every X2/S1 handover without SGW Relocation procedures), because the MME has to update the ULI to the SGW and the PGW, but cannot utilize MABR to consolidate the ULI updates into a single MABR message to the PGW. In other words, the MABR procedure (e.g., which would otherwise be able to consolidate the multiple MBR messages into a single MABR message) cannot be used in this situation, due to the 3GPP restriction on using MABR with UE location information when communicating with the PGW. Therefore, individual MBR messages are sent for each IDLE-Active transition and/or X2/S1 handover for 5G NSA devices (e.g., UEs), which can rapidly increase the amount of signaling overhead, congestion, and/or latency on the cellular network. In particular, existing approaches must first transmit ULI/UE time zone information/user CSG information to the SGW, and the SGW subsequently transmits individual MBR messages in order to update the ULI/UE time zone information/user CSG information to the PGW. Such approaches may result in additional signaling on at least the S11 and S5/S8 interfaces.

Therefore, there exists a need for systems and techniques to provide optimized MABR support and signaling to the PGW for IDLE-Active movements, handovers, and/or state changes without SGW relocation procedures. For example, there is a need to reduce signaling overhead and/or the total volume of signaling messages exchanged on the network in propagating updated or most current location and/or subscriber information to a PGW.

The present technology includes systems, methods, and computer-readable media (also referred to as "systems and techniques") for solving these problems and discrepancies.

In existing Evolved Packet Core (EPC) architectures, such as those specified by the 3rd Generation Partnership Project (3GPP), Serving Gateways (SGWs) are data plane elements that can route and forward user data packets, while also acting as a mobility anchor for the user plane during inter-eNodeB handovers. SGWs can additionally, or alternatively, act as an anchor for mobility between LTE and other 3GPP technologies. As discussed previously, Packet Data Network (PDN) Gateways (PGWs) may provide UE IP-connectivity access network (IP-CAN) session connectivity to one or more external packet data networks (PDNs), such as, for example, the Internet. The PGW can also serve as a policy enforcement point to manage Quality of Service (QOS), online/offline flow-based charging, data generation, deep-packet inspection, and/or lawful intercept, etc.

As mentioned previously, the EPC architecture can be implemented as a split architecture with control plane and user plane separation, for example based on a Control and User Plane Separation (CUPS) approach for decoupling PGW control and user plane functions. A control plane and user plane split architecture for the EPC can provide for a centralized control plane that can be hosted in a data center and a distributed data plane that can be hosted closer to Radio Access Network (RAN) nodes such as, for example evolved Node Bs (eNodeBs). By locating the data path/user plane (U-plane) forwarding elements closer to RAN nodes, lower latency of communication can be achieved. In some cases, by locating the data path routers closer to the RAN nodes (e.g., eNodeBs), a U-plane Serving Gateway (SGW) entity can potentially be removed from the data path and eNodeBs can directly route packet to a nearest Packet Data Network (PDN) Gateway (PGW) U-plane entity.

As referred to herein, a PGW U-plane entity, which can manage U-plane data traffic, can be referred to interchangeably as a 'PGWU' or a 'PGW-U.' Similarly, a PGW control plane (C-plane) entity, which can manage control plane traffic for a corresponding PGW-U, can be referred to interchangeably as a 'PGWC' or a 'PGW-C.' An SGW user plane entity, which can manage user plane data traffic, can be referred to interchangeably as an 'SGWU' or an 'SGW-U.' Likewise, an SGW control plane entity, which can manage control plane traffic for a corresponding SGW-U, can be referred to interchangeably as an 'SGWC' or an 'SGW-C.'

An example control plane 110 and user data plane 130 split architecture 100 for a communication system is described with reference to FIGS. 1A-1B. Referring to FIG.

Figure 1A:
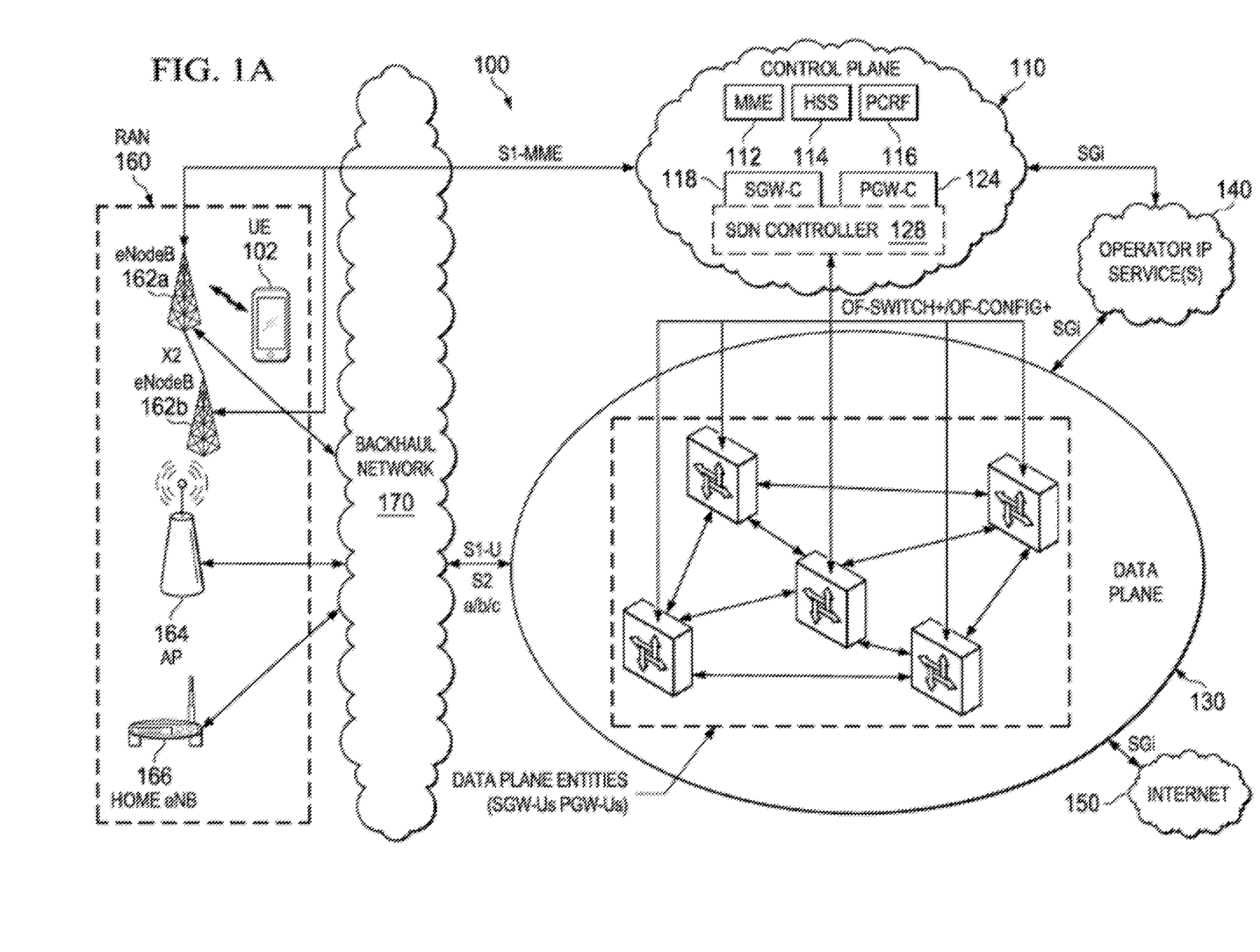
FIG. 1A illustrates a simplified block diagram of an example split control and user plane architecture, in accordance with some embodiments of the present disclosure.

1A, FIG. 1A is a simplified block diagram illustrating architecture 100. In some cases, architecture 100 is a split control and user plane EPC architecture. Control plane 110 can include one or more control plane entities such as a Mobility Management Entity (MME) 112, a Home Subscriber Server (HSS) 114, a Policy and Charging Rules Function (PCRF) 116, an SGW-C 118 and a PGW-C 124. In some embodiments, an SDN controller 128 can be provided in the control plane 110 to install and manage flows, routing, etc. across data plane entities (e.g., SGW-Us, PGW-Us) deployed in the user data plane 130. The SDN controller 128 can have a full topology view of the entire network and therefore may make decisions on optimal resource allocation in the data plane. In some cases, SDN controller 128 can be removed from the control plane, in which case SGW-C 118 and/or PGW-C 124 can perform SDN controller functions as needed.

In some embodiments, the control plane entities of the control plane 110 can be located in a data center or cloud deployment. Switching entities (e.g., SGW-Us, PGW-Us) can be distributed throughout user data plane 130, which can interface with nodes associated with a RAN 160. Nodes associated with RAN 160 can include one or more eNodeBs 162a-162b, one or more wireless (e.g., WiFi) access point(s) (AP(s)) 164 and/or one or more small cell radio(s) (e.g., Home eNodeB(s) 166). The interface with nodes of RAN 160 can be performed via a backhaul network 170. Each data plane entity (e.g., data plane routing/switching entity) can serve a set of one or more eNodeBs (e.g., locality specific). For example, in some embodiments, the control plane entities could be housed in a regional data center including a number of interconnected servers, while the data plane routing/switching entities can be housed in servers/sites closer to the RAN nodes. In some examples, architecture 100 can reduce the data path latency by routing packets through a closest router to the RAN 160, where a UE is connected to a node of the RAN 160. A user equipment (UE) 102 is also shown in FIG. 1A connected to eNodeB 162a.

In a virtualized control plane architecture, the MME 112, SGW-C 118 and PGW-C 124 may all be operating within a same data center. In such scenarios, the functions of two or more these network elements can be combined into a virtualized network function (VNF) or virtual machine (VM), referred to herein as a 'mobility controller'. In such a scenario, the messaging between the MME 112, the SGW-C 118 and/or the PGW-C 124 can be internalized and the flow installation at the SGW-U/PGW-U (e.g., either through the SDN controller or directly) can be performed by the combined VNF or VM.

RAN 160 can provide a communications interface between UE 102 and the control and user plane entities, operator IP service(s) 140 and/or internet 150 for one or more 3GPP and/or non-3GPP Internet protocol (IP) access networks. 3GPP access networks can include Global System for Mobile Communications (GSM) Enhanced Data Rates for GSM (EDGE) radio access network (GERAN), a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A). 3GPP access networks can additionally, or alternatively, include a fifth-generation (5G) network. Non-3GPP IP access networks can include wireless local access networks (WLANs) such as WiFi, Worldwide Interoperability for Microwave Access (WiMAX), Bluetooth™ or the like.

eNodeBs 162a-162b can offer suitable connectivity to one or more UEs (e.g., UE 102) using any appropriate protocol or technique. eNodeBs 162a-162b can represent radio access point devices that can allow UEs to connect to a wired network using 4G/LTE/LTE-A/5G or any other appropriate standard. In some examples, a home eNodeB (HeNB) 166 can offer suitable connectivity to one or more UEs using any appropriate protocol or technique. HeNB 165 can represent a radio access point device that can allow UEs to connect to a wired network using 4G/LTE/LTE-A/5G or any other appropriate standard. An HeNB can sometimes be referred to as a small cell radio, small cell radio access point, a femtocell, a picocell, etc. In general, a small cell radio operates at lower power compared to a macro cell radio such as, for example, an eNodeB. Small cell radios are typically deployed in environments in which macro cell coverage is limited (e.g., in a building, etc.) and/or where user density is increased beyond the capabilities of one or more surrounding macro cell radios. Thus, small cell radios can offer connectivity to proximate users. A wireless access point (AP) 164 can offer suitable connectivity to one or more UEs using any appropriate wireless protocol or technique, such as for example, WiFi and the like.

A user or subscriber can be associated with the operation of a corresponding UE for one or more voice and/or data sessions. A subscriber associated with a given UE (e.g., UE 102) can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

UE 102 can be associated with any users, subscribers, employees, clients, customers, etc., wishing to initiate a flow in architecture 100 (e.g., via a wireless communications network such as a 4G network, a 5G network, etc.). The terms 'user equipment', 'mobile node', 'end user', 'user', and 'subscriber' can include various devices used to initiate a communication, such as a computer, a personal digital assistant (PDA), a laptop or electronic notebook, a cellular telephone, a smartphone, a tab, an IP phone, a tablet computer, or other device, component, element, or object capable of initiating voice, audio, video, media, or data exchanges within architecture 100. UE 102 can include one or more interfaces to a human user, such as a microphone, a display, a keyboard, or other terminal equipment. UE 102 may also be any device that seeks to initiate a communication on behalf of another entity or element such as a program, a database, or any other component, device, element, or object capable of initiating an exchange within architecture 100. In some cases, UE 102 may include or be associated with subscription for network access and application services (e.g., voice), etc. Once the access session is established, the user can register for application services as well, without additional authentication requirements. Within architecture 100, IP addresses (e.g., for UE 102 and/or for one or more other elements included in architecture 100) can be assigned using dynamic host configuration protocol (DHCP), Stateless Address Auto-configuration (SLAAC), etc., during default bearer activation processes, etc., or any suitable variation thereof. IP addresses used within architecture 100 can include IP version 4 (IPv4) and/or IP version 6 (IPv6) IP addresses.

MME 112 can be implemented as the primary control element for the EPC. For example, MME 112 can provide for UE tracking and paging procedures including, for example, retransmissions, tracking area list management, idle mode UE tracking, etc. For example, the MME 112 can maintain tracking information for UE 102 regarding previous and current information for UE transitions between or within Radio Access Networks (RANs). The MME 112 may further provide for UE bearer procedures including activation, deactivation and modification, among others. A Radio Access Bearer (RAB) or, more generally, a 'bearer' can refer to a path, channel, tunnel or the like through which communications can be exchanged between two endpoints for a particular service, application, etc. Typically, bearers are referred to in association with communications exchanged between a UE and one or more nodes of the EPC.

In some examples, a default bearer is established upon initial attachment of the UE 102 to a given RAN node (e.g., a given node of the RAN 160). In some examples, one or more dedicated bearers can be established for a given UE for one or more specialized services or applications provided to the UE such as, for example, a Voice over LTE (VOLTE) session, a data session, a Voice over IP (VOIP) session, a gaming session, combinations thereof or the like. A bearer for a given UE can be associated with one or more (or all) of the following at the EPC: 1) an IP address for the UE, which can be allocated from a pool of IP addresses via DHCP, SLAAC, etc.; 2) an IP address for an EPC node for a given PDN connection; and 3) a general packet radio service (GPRS) Tunnelling Protocol User Plane (GTP-U) tunnel from a PGW to a SGW and a GTP-U tunnel from the SGW to the eNodeB to which the UE is connected (e.g., if the UE is in a CONNECTED mode or state). A bearer can be identified using an EPS Bearer Identity (EBI).

The HSS 114 may offer a subscriber database in 3GPP (e.g., GSM, LTE, etc.) environments. In some aspects, the HSS 114 can provide functions similar to those offered by an Authentication, Authorization and Accounting (AAA) element server, which can provide functions including, but not limited to, UE authentication, authorization and accounting services. For example, when a UE (e.g., UE 102) moves to 3GPP access, the HSS 114 can be aware of this location and the UE's PDN anchor point (e.g., the corresponding PGW-U). HSS 114 and PCRF 116 can coordinate state information for the UE 102 (and synchronize this information) to provide mobility within the architecture 100. PCRF 116 may decide policy control and/or charging activities to apply to UE 102 based on various Policy Charging and Control (PCC) rules. PCRF 116 can be configured to use user subscription information as a basis for the policy and charging control decisions. The subscription information may apply for both session-based and non-session based services. PCRF 116 may be referred to generally as a policy server. Additionally, PCRF 116 may determine PCC rules based on an application or service described to the PCRF from an application function (AF). The AF may describe applications/services to PCRF 116 that may require dynamic policy and/or charging control for one or more UEs.

In some examples, data path switching entities (e.g., SGW-Us, PGW-Us) can be OpenFlow™ (OF) capable switching entities, denoted herein as 'OF-SWITCH+', capable of OF configuration, denoted herein as 'OF-CONFIG+', via SDN controller 128 or SGW-C 118 and PGW-C 124 (e.g., if no SDN controller is deployed). OpenFlow™ is a protocol defined by the Open Networking Foundation (ONF) that provides an interface between control plane entities and user data plane entities for programming flows (e.g., using IP addresses, tunnel endpoints, ports, etc.) for SDN architectures.

Control plane entities and user plane entities can interface with various operator IP service(s) 140. The operator IP service(s) 140 can include an IP multimedia subsystem (IMS) that provides VOLTE capabilities for UEs (e.g., UE 102). The control plane entities can further interface with Internet 150. In some aspects, architecture 100 may implement user datagram protocol/internet protocol (UDP/IP) connections and/or transmission control protocol/internet protocol (TCP/IP) connections. Architecture 100 can additionally, or alternatively, implement any other suitable communication protocol for transmitting and receiving packets. In some cases, operator IP service(s) 140, backhaul network 170 and internet 150 can be provided as multiple networks interconnected via one or more network appliances, elements, gateways, etc. In some aspects, operator IP service(s) 140 and backhaul network 170 may overlap with and/or be included within internet 150.

In some aspects, control plane entities of control plane 110 and data plane entities of data plane 130 can collectively be referred to herein as a "core network"' or an "EPC". Backhaul network 170 may provide infrastructure to provide at least one differentiated, secure, reliable and manageable communication channel, which facilitates interconnections between one or more nodes of RAN 160, one or more data plane entities of data plane 130 and one or more control plane entities of control plane 110. The aforementioned infrastructure can include, but is not limited to, one or more network elements such as routers, switches, gateways, etc.; one or more communication links (e.g., wired or wireless); one or more interfaces to facilitate user data and control plane exchanges according to one or more signaling protocols; and/or combinations thereof or the like.

Communications in a network environment can be referred to herein as "network traffic" or "traffic," which may be inclusive of packets. A packet is a formatted unit of data and can contain both control information (e.g., source and destination address, etc.) and data, which is also known as payload. In some cases, control information can be included in headers and trailers for packets. Network traffic can be sent and received according to any suitable communication messaging protocols. Suitable communication messaging protocols can include a multi-layered scheme such as the Open Systems Interconnection (OSI) Model, or any derivations or variants thereof. For example, architecture 100 may include a configuration capable of TCP/IP communications for the transmission or reception of packets in a network. Architecture 100 may also operate in conjunction with UDP/IP traffic or any other suitable protocol where appropriate and based on particular needs. Other protocols or interfaces that can be used in architecture 100 can include 3GPP DIAMETER-based protocols, remote authentication dial in user service (RADIUS) protocols, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc. The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets. As shown in FIG. 1A, an S1-MME interface, as defined in 3GPP standards, can be provided between eNodeBs 162*a*-162*b* and the control plane 110 (e.g., for interfacing with MME 112). An X2 interface, as defined in 3GPP standards, can be provided for interfacing between eNodeB 162a-162b. Additional interfaces, as defined in 3GPP standards, can include S1-U, S2a, S2b, S2c, etc. and can be provided between backhaul network 170 and the data plane 130 entities.

Figure 1B:
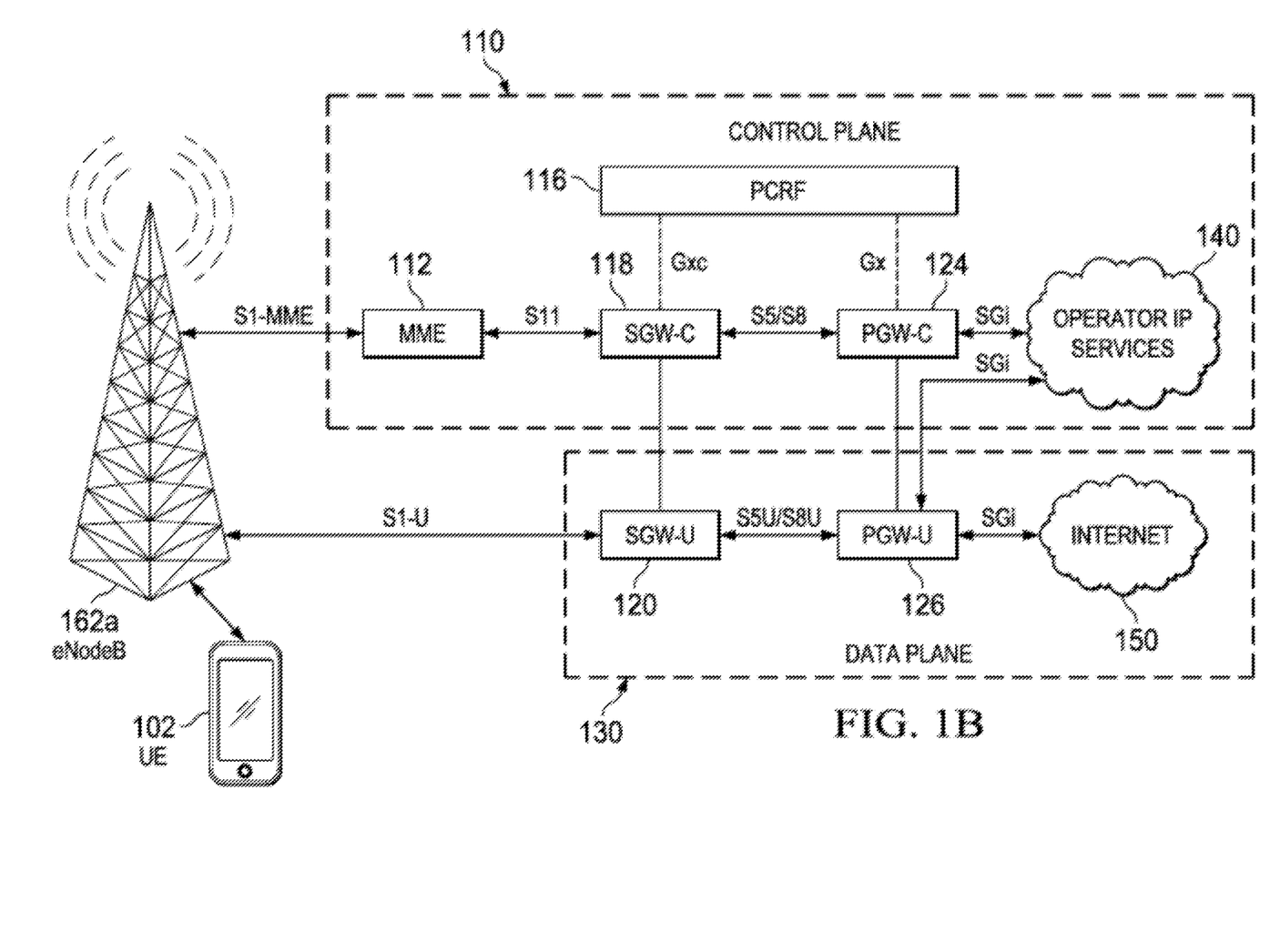
FIG. 1B illustrates a simplified block diagram of further details of an example split control and user plane architecture, in accordance with some embodiments of the present disclosure.

Referring to FIG. 1B, FIG. 1B is a simplified block diagram illustrating additional example details that can be associated with architecture 100 for the control plane 110 and data plane 130 split of EPC packet gateway nodes. FIG. 1B includes eNodeB 162a, MME 112, SGW-C 118 and SGW-U 120, PGW-C 124 and PGW-U 126, and PCRF 116. As illustrated, MME 112, PCRF 116, SGW-C 118 and PGW-C 124 may each be included in control plane 110, while SGW-U 120 and PGW-U 126 are included in data plane 130. In some embodiments, SGW-U and PGW-U sessions can be collapsed on the user plane—for example, for sessions supporting Collapsed Call on User Plane, the SGW-U and PGW-U sessions can be collapsed into a converged User Plane Function (UPF).

Returning to the discussion of FIG. 1B, as illustrated the control plane entity SGW-C 118 can interface with user data plane entity SGW-U 120, and control plane entity PGW-C 124 can interface with user data plane entity PGW-U 126, in both cases via one or more respective interfaces. For example, the respective interfaces can be implemented based on 3GPP standards. In some cases, as provided by 3GPP standards, MME 112 can interface with SGW-C 118 via an S11 interface and SGW-C 118 can interface with PGW-C 124 via an S5/S8 interface (e.g., an S5/S8 interface for control plane 110 traffic exchanged between the control plane entities). In some examples, the S8 interface may be used when a UE (e.g., UE 102) is roaming between different operators. The S5 interface is a network internal interface for a given network operator. Control plane traffic can be exchanged between eNodeB 162a and MME 112 via the S1-MME interface. Data plane traffic can be exchanged between eNodeB 162a and SGW-U 120 via the S1-U interface (e.g., also referred to herein as SIU). SGW-U 120 and PGW-U 126 can interface via an S5U/S8U interface for data plane 130 traffic exchanged between the data plane entities. PCRF 116 can interface with SGW-C 118 via a Gxc interface and can interface with PGW-C 124 via a Gx interface.

In some examples, if an SGW and a PGW are deployed in a control and user plane split architecture as shown in FIGS. 1A-1B, then a PGW-C(e.g., PGW-C 124) can be configured to subscribe to User Location Information (ULI) change notifications with the MME 112. In some aspects, the ULI or User Location Information can refer to a ULI Information Element (IE) as defined in 3GPP TS 29.274, Section 8.21, which the MME 112 can assemble based on location related information received or tracked for a given UE. The MME 112 can communicate the ULI IE to other core network elements using various messages, as will be described in greater depth below. In some aspects, the term "ULI" can refer generally to ULI related location information that can be used in a ULI IE. According to TS 29.274, Section 8.21, location information that can be used in a ULI IE can include Cell Global Identifier (CGI), ECGI, Service Area Identifier (SAI), Tracking Area Identifier (TAI), Routing Area Identifier (RAI) and Location Area Identifier (LAI).

In some examples, based at least in part on the Radio Access Technology (RAT) type (e.g., 3G, 4G, 5G, etc.) being used, the MME 112 can receive, obtain, or otherwise determine one or more updates, changes, modifications, etc., for ULI related location information and/or other subscriber information. In such scenarios, upon every ULI change (e.g., upon every update or modification to ULI), the SGW-C 118 and/or the PGW-C 124 can be notified of the ULI change by the MME 112 through a Modify Bearer Request (e.g., MBR or MBReq) or Change Notification Request.

In various use case scenarios, different nodes can potentially change during every UE (e.g., UE 102) mobility procedure. For example, one or more (or all) of the following can occur during a UE mobility procedure: 1) SGW-U can change along with SGW-C changing; 2) SGW-U can change without SGW-C changing; and 3) PGW-U can change. Accordingly, in various scenarios a UE mobility procedure (also referred to herein as a "UE mobility event") can be associated with an SGW-U/SGW-C change with no change in PGW-U; an SGW-U/SGW-C change and a PGW-U change; a PGW-U change with no change in SGW-U/SGW-C; etc.

Various approaches can be used for the selection of an SGW-U and/or a PGW-U during UE mobility. In one example, selection of an SGW-U and/or a PGW-U can be performed by the MME 112. For instance, during mobility procedure operations, based on a target eNodeB identifier, the MME 112 can perform a DNS look-up for an SGW-U using a Tracking Area Identifier (TAI) and/or an eNodeB identifier Fully Qualified Domain Name (FQDN). The DNS look-up can be used to determine an SGW-U closest to the eNodeB to which a UE connects during the UE mobility event. In some aspects, an eNodeB identifier can include an E-UTRAN Cell Global Identifier (ECGI), which can include a Public Land Mobile Node (PLMN) identifier portion and a Cell Identity portion. In some examples, the MME 112 can perform a DNS look-up for a PGW—U based on the Access Point Name (APN) FQDN based DNS query to determine a PGW-U closest to a selected SGW-U. In some aspects, the MME 112 can run a topological selection algorithm (e.g., as specified in TS 29.303) and select a PGW-U that is topologically closer to a selected SGW-U or the MME may inform the SGW-C that it has to relocate the SGW-U (e.g., and the SGW-C can inform the PGW-C that it has to relocate the PGW-U).

In some examples, the MME 112 can be configured with a local configuration, which can be used to decide whether SGW-U/PGW-U relocation is needed based on the target TAI; thereby avoiding DNS lookups at the MME 112. For example, the MME 112 can indicate to the SGW-C 118 and the PGW-C 124 that a change of the current SGW-U and/or the current PGW-U associated with a UE's flow(s) may be needed. In response, the SGW-C 118 and/or the PGW-C 124, respectively, can each select a respective new SGW-U and/or a new PGW-U to service the UE's flow(s). As referred to herein, the terms 'UE PDN IP address' and 'UE IP address' can be used interchangeably to refer to an IP address for a given UE for a PDN connection associated with a given APN. In some examples, an APN can include operator IP service(s) 140, internet 150 and/or any other PDN to which a given UE may connect or signal a request to connect.

In some examples, data plane entity selection can be performed by each of the SGW-C 118 and the PGW-C 124 directly. For example, if an SGW and PGW are deployed in a control and user plane split architecture as shown in FIGS. 1A-1B, then a PGW-C(e.g., PGW-C 124) can be configured to subscribe to User Location Information (ULI) change notifications with or from the MME 112. In such a scenario, upon every ULI change, the PGW-C 124 can be notified of the ULI change by the MME 112 through a Modify Bearer Request (e.g., also referred to as an MBR or MBReq) or Change Notification Request.

When the SGW-C 118 and PGW-C 124 receive an MBReq or other message with updated ULI (or other updated user information, location information, subscriber information, etc.), the SGW-C 118 may execute an SGW-U selection algorithm to determine if an SGW-U relocation is needed and, if so, can allocate a new SGW-U SIU Fully Qualified Tunnel Endpoint Identifier (FTEID) and a new SGW-U S5U FTEID. Similarly, PGW-C 124 can execute a PGW-U selection algorithm to determine if a PGW-U relocation is needed and, if so, can allocate a new PGW-U SSU FTEID for a newly selected PGW-U and/or can allocate a new UE PDN IP address corresponding to the newly selected PGW-U. The new FTEID(s) can be communicated to the MME 112 in a Modify Bearer Response (MBRsp) such that MME 112 informs the same to the eNodeB (e.g., eNodeB 162*a* or 162*b*) to which the UE is connected. As referred to herein, the terms 'FTEID' and 'F-TEID' can be used interchangeably. In some cases, the SGW and the PGW may need to support a selection algorithm for user plane entity based on the current ULI of a given UE, which may require both the SGW and the PGW to subscribe to ULI reporting/updates from the MME (e.g., MME 112).

As contemplated herein, the transmission of ULI updates to both the SGW and the PGW, in response to or during every UE mobility procedure, can result in large amounts of signaling overhead that may cause or otherwise be associated with increased network congestion, latency, etc. Aspects of the present disclosure are directed to providing signaling optimization for Modify Access Bearer Request (MABR) messaging in one or more networks. For example, the systems and techniques described herein can be implemented in a 4G cellular network core (e.g., Evolved Packet Core (EPC)), a 5G cellular network core (e.g., 5G Core (5GC)), etc., to enable MABR support at (or for) a Mobility Management Engine (MME). In some aspects, the systems and techniques can enable MABR support for MME signaling that includes UE or subscriber information. As will be described in greater depth below, UE or subscriber information can include, but is not limited to, one or more of UE location information, user Closer Subscriber Group (CSG) information, UE Time Zone (TZ) information, and/or presence reporting area information. In some aspects, the systems and techniques can enable MABR support for MME signaling that includes some or all of the aforementioned UE or subscriber information, wherein the MME provides the UE or subscriber information to at least a Packet Data Network (PDN) Gateway (e.g., PDN Gateway or PGW).

In some aspects, the systems and techniques described herein can be utilized to provide advance MABR support for signaling optimization between an MME and one or more (or both) of an SGW and a PGW. In one illustrative example, the systems and techniques can be utilized to provide MABR support between an MME and SGW/PGW in the previously unsupported use case (e.g., under the existing 3GPP standard) in which the MME needs to send UE Location Information (ULI), Time Zone (TZ) information, User Closed Subscriber Group (CSG) information, and/or Presence Reporting Area information, etc., to the PGW.

In particular, as will be described in greater depth below, feature negotiation can be performed between the MME and SGW for the advance MABR support. Based on the negotiated advance MABR support, the MME is able to send a single MABR message with ULI/CSG information/UE TZ information to the SGW (e.g., at step 1 in the example call flow 200 depicted in FIG. 2 and described below). Notably, the MME may send a single MABR message in this scenario, whereas the 3GPP standard's specification may prevent MABR from being used if there is a location change and/or if the MME has to update ULI to the SGW/PGW.

In other words, aspects of the present disclosure can be used to transmit a single MABR message rather than multiple and/or duplicative MBR messages. In some aspects, the PGW can set a flag or otherwise communicate with the SGW to indicate whether or not the PGW requests to receive ULI/CSG/UE TZ information (e.g., at step 5 in the example call flow 200 depicted in FIG. 2 and described below). The SGW can subsequently forward the ULI to the PGW (e.g., at step 11 in the example call flow 200 depicted in FIG. 2 and described below) based at least in part on determining that the flag to update ULI information to the PGW is enabled. In some examples (e.g., such as according to the existing 3GPP specification) the SGW would always forward the ULI to the PGW, regardless of whether the PGW requested the ULI or would be able to make use of the ULI.

Figure 2:
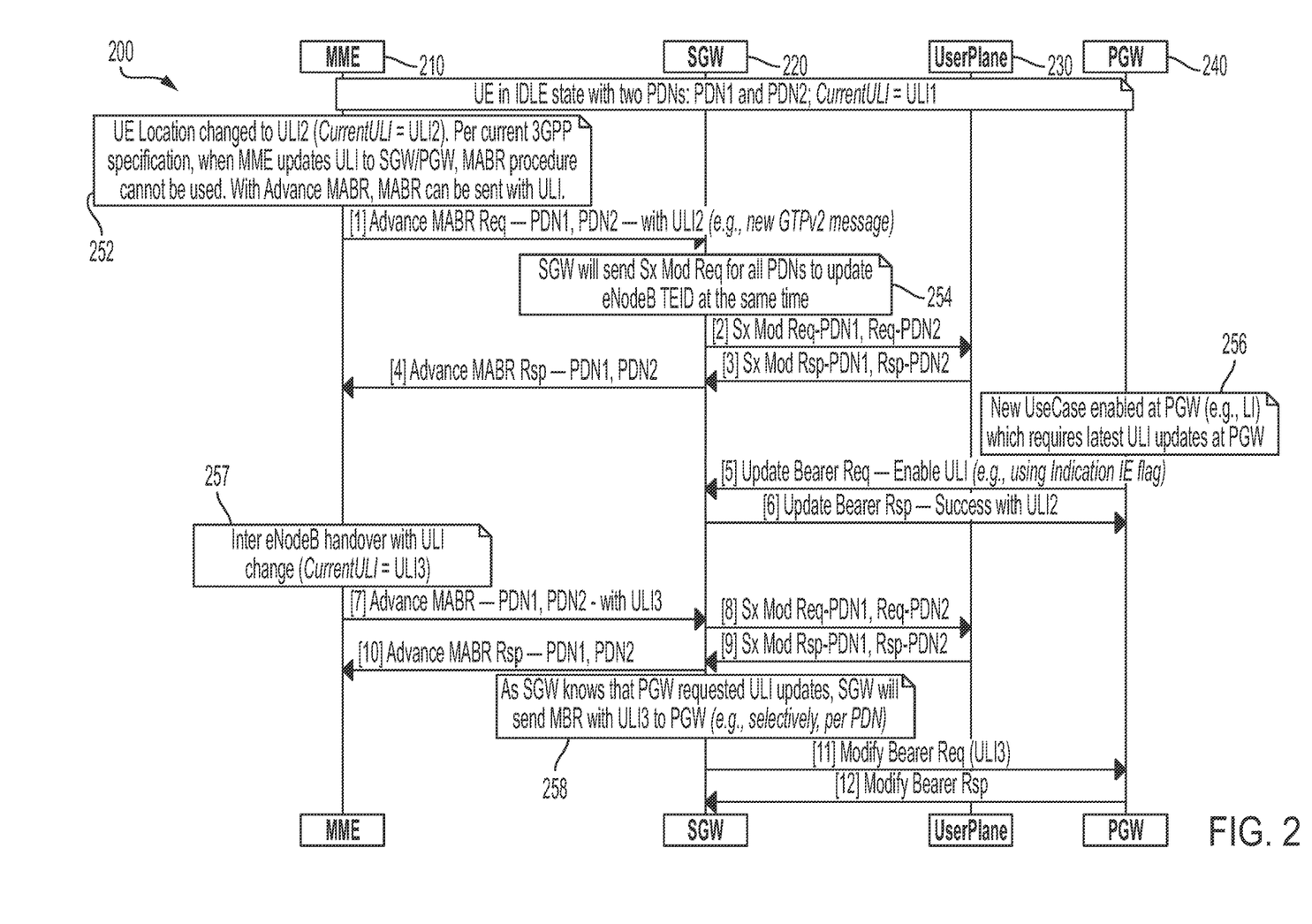
FIG. 2 illustrates an example network environment and network call flow for providing signaling optimization for Modify Access Bearer Request (MABR) messaging, in accordance with some embodiments of the present disclosure.

The disclosure turns now to FIG. 2, which depicts an example network environment and associated network call flow for providing signaling optimization for Modify Access Bearer Request (MABR) messaging in one or more networks, according to some aspects of the present disclosure. In some embodiments, the example call flow 200 of FIG. 2 may be utilized for or otherwise implemented in a 4G/LTE cellular network, a 5G cellular network, and/or other wireless and/or cellular networks, etc. In one illustrative example, the example call flow 200 can be utilized in a 4G cellular network core (e.g., Evolved Packet Core (EPC)) and/or a 5G cellular network core (e.g., 5G Core (5GC)), etc., to enable MABR support to update user information from a mobility management engine (MME) 210 to a PDN Gateway (PGW) 240, as will be described in greater depth below.

As illustrated in FIG. 2, the example network environment can include a plurality of network components and/or network entities (e.g., 210, 220, 230, 240), although it is noted that one or more of the depicted network components 210-240 can be divided into multiple sub-components to provide a network environment having a greater quantity of network components than is depicted in the example of FIG. 2. Additionally, or alternatively, in some embodiments one or more of the depicted network components 210-240 can be combined into aggregate network components to provide a network environment having a lesser quantity of network components than is depicted in the example of FIG. 2. Below the network components 210-240 are a series of data flows and communications according to aspects of the present disclosure. The network components 210-240 and the series of data flows and communications will each be described in turn below.

As illustrated in FIG. 2, the example network environment can include an MME 210, an SGW 220, a user plane 230, and a PGW 240. In some examples, MME 210 can be the same as or similar to one or more of the MMEs described above (e.g., MME 112 illustrated in FIGS. 1A and 1B). SGW 220 can be the same as or similar to one or more of the SGWs described above (e.g., SGW-C 118, SGW-U 120, etc., illustrated in FIGS. 1A and 1B). PGW 240 can be the same as or similar to one or more of the PGWs described above (e.g., PGW-C 124, PGW-U 126, etc., illustrated in FIGS. 1A and 1B). In some aspects, the user plane 230 can be the same as or similar to one or more of the user planes described above, including, but not limited to, the user data plane 130 illustrated in FIGS. 1A and 1B.

The disclosure turns next to the example process flow 200 that is illustrated in FIG. 2. Twelve different steps are depicted, although it is appreciated that a greater or lesser number of steps and/or different ordering(s) and/or combination(s) of the illustrated example steps can be utilized without departing from the scope of the present disclosure. Connecting lines with arrows indicate the entities, components, services, etc., that may be involved in a given step, although it is appreciated that different components can be utilized for various steps without departing from the scope of the present disclosure. It is additionally noted that the example process flow 200 of FIG. 2 is illustrated with steps 1-12 for purposes of clarity of explanation, e.g., the steps can be performed in a different order than is illustrated in FIG. 2, and/or multiple steps can be performed concurrently, without departing from the scope of the present disclosure.

As mentioned previously, a MABR (Modify Access Bearer Request) procedure can be implemented based on one or more MABR messages. A MABR message (also referred to herein as a MABR or MABReq) is a UE-level message that can be used to reduce signaling overhead, for example for UE IDLE-Active movements, X2/S1 handovers, etc., without SGW relocation procedures. The existing 3GPP specification restricts MABR support on an MME (e.g., such as MME 210) for scenarios in which the MME is used to send UE location information, user CSG information, UE time zone information, and/or presence reporting area information, to the PGW. In some aspects, the UE location information, user CSG information, UE time zone information, and/or presence reporting area information, etc., may be collectively referred to herein as User Location Information (ULI).

Accordingly, aspects of the present disclosure are directed to providing advance MABR support for signaling between an MME (e.g., MME 210) and an SGW (e.g., SGW 220) and/or a PGW (e.g., PGW 240), while additionally supporting uses cases such as ULI-based triggers and/or Charging Data Record (CDR)-based triggers from a PCRF or other network charging function (not shown).

As illustrated in FIG. 2, the example call flow 200 can begin with a UE in an IDLE state. In one illustrative example, the UE can be a 5G Non-Standalone (NSA) device, capable of connecting to a 5G RAN and a 4G/LTE EPC. The UE can be associated with two PDNs, e.g., PDN1 and PDN2. For example, the UE can be configured with a first default bearer for connection to PDN1 and a second default bearer for connection to PDN2. In some aspects, PDN1 and PDN2 can include PDNs such as the Internet, IMS, MMS, etc. In one illustrative example, a given UE can transmit and receive data using a connection to PDN1 (e.g., the Internet), while using a connection to PDN2 for voice calls (e.g., using IMS). The UE can additionally be associated with a current ULI, which can include the current or latest user/subscriber information. As noted above, the current ULI can include UE location information, user CSG information, UE time zone information, and/or presence reporting area information, etc. As illustrated, the example call flow 200 can begin with the UE in an IDLE state, with PDN1 and PDN2, and with CurrentULI=ULI1.

At some point in time, the ULI can change or otherwise be updated, such that CurrentULI changes from ULI1 (e.g., the ULI in the initial state of the UE, described above) to ULI2. For example, the transition from ULI1 to ULI2 is indicated in FIG. 2 at 252. Based on the existing 3GPP specification for MABR, a MABR message cannot be used by an MME (e.g., such as MME 210) to update ULI to the SGW/PGW (e.g., such as SGW 220/PGW 240). Using one or more aspects of the present disclosure, and the approaches described herein, a MABR message can be used by MME 210 to update ULI to SGW 220/PGW 240 (e.g., MME 210 can update CurrentULI from ULI1 to ULI2 for SGW 220/PGW 240 using one or more MABR messages).

As discussed previously (e.g., with respect to FIGS. 1A and 1B), MME 210 can be a mobility anchor for the given UE (e.g., the UE associated with CurrentULI, ULI1, ULI2, etc.), wherein all of the PDN connections for the given UE pass through MME 210. In one illustrative example, the Advance MABR Req message of step 1 can be generated by MME 210 and transmitted to SGW 220 in response to an IDLE-Active movement by the UE and/or the occurrence of an X2/S1 handover associated with the UE.

For instance, in the context of the example in which PDN1 is used to provide the UE with a data connection to the Internet and PDN2 is used to provide the UE with a voice connection on IMS, an IDLE-Active movement can be associated with transitioning the UE's data session on PDN1 from an idle state to an active state (e.g., the UE transitions from not transmitting/receiving data to transmitting/receiving data) and/or can be associated with transitioning the UE's voice session on PDN2 from an idle state to an active state (e.g., the UE transitions from not transmitting/receiving on a voice call session to transmitting/receiving on a voice call session). Similarly, an X2/S1 handover can occur based on the UE experiencing an inter eNodeB handover (e.g., when the UE moves from a first eNodeB to a second eNodeB).

In the scenario in which the UE is a 5G NSA device, the 5G NSA UE may be deployed in a network that includes a 5G RAN and a 4G/LTE EPC. In this scenario, a PDN session (e.g., a data or Internet session) can be created, and will first attach its data path to an eNB before subsequently switching the path to a gNB (e.g., data session establishment can be implemented as a two-step process).

In this example, a location change will occur every time a data or Internet session is established by a 5G NSA UE—in particular, each data session establishment will be associated with a location change from the eNB location to the gNB location. In one illustrative example, consider a 5G NSA UE that is initially in an IDLE state (e.g., such as the initial IDLE state depicted in FIG. 2). To transition its data/Internet session from the IDLE state to an active state, the UE will first attach to the eNB location followed by a subsequent attachment (and location change) to the gNB location. At some future time, the data/Internet session again becomes idle (e.g., after the UE has finished transmitting/receiving data). Every time that the data/Internet session at the UE is re-activated from the idle state (e.g., every time an IDLE-Active movement occurs), the same two-step process involving a location change from the eNB location to the gNB location will occur.

From the perspective of the MME (e.g., MME 210), every IDLE-Active movement associated with a 5G NSA UE (or other 5G NSA device) may appear to be a location change—again, because the 5G NSA UE first establishes a connection to the eNB location before switching the connection to the gNB location. Notably, at the time the data/Internet session is transitioned back to idle for the UE, the MME determines that the PGW (e.g., PGW 240) has the gNB location associated to the UE. Accordingly, when the data/Internet session is later reactivated, when the first step connection to the eNB location occurs, the MME determines that there has been a location change (e.g., ULI change), because from the MME's perspective, the PGW has the gNB location associated to the UE while the MME sees the eNB location associated to the UE.

In the context of the example of FIG. 2, rather than transmitting two separate MBR messages corresponding to the location change from ULI1 to ULI2 (e.g., one MBR message for PDN1 and a second MBR message for PDN2), it is contemplated that the MME 210 can instead generate and transmit a single MABR message, for both PDN1 and PDN2, that corresponds to the location change from ULI1 to ULI2.

In particular, at step 1, the MME 210 can generate and transmit a MABR message (e.g., MABR Req) to SGW 220. The MABR request can include the updated CurrentULI, e.g., CurrentULI=ULI2. Recalling that the MABR procedure may be intended for use with the access bearers associated with all of the PDN connections of a UE, the MABR Req. depicted in step 1 can be a UE-level message that consolidates a first MBReq message associated with PDN1 and a second MBReq message associated with PDN2. In one illustrative example, the MABR Req depicted in step 1 may also be referred to as an "Advance MABR Req" or "Advance MABR." In some aspects, the Advance MABR Req can be provided as a new GTPv2 (e.g., GPRS tunneling protocol version 2) message.

For instance, in one illustrative example, the Advance MABR Req message of step 1 can be used to implement feature negotiation between MME 210 and SGW 220, wherein the negotiated feature is support for the Advance MABR disclosed herein. As will be explained in greater depth below, in the absence of the negotiated support for Advance MABR (e.g., in the absence of step 1), the SGW 220 will not provide an advance MABR response (e.g., 'Advance MABR Rsp. depicted in step 4) to MME 210, but will instead fall back to transmitting separate MBR messages for each PDN associated with the UE. In this example, SGW 220 would fall back to transmitting one MBR Rsp. for PDN1 and one MBR Rsp. for PDN2.

Additionally, in the absence of the step 1 negotiated support for Advance MABR (e.g., in the absence of step 1), the SGW 220 will always forward any updated ULI to PGW 240, even if PGW 240 has no need or anticipated use for the ULI or other current/updated location or subscriber information. In other words, in the absence of the step 1 negotiated support for Advance MABR, SGW 220 will always transmit a Modify MBR message, for each PDN (e.g., PDN1 and PDN2), to PGW 240 with the updated ULI. Accordingly, in the absence of the step 1 negotiated support for Advance MABR, SGW 220 will always perform steps 11 and 12 of the example call flow 200 for each ULI change or update, and for each PDN associated with the UE, with PGW 240 lacking the ability to communicate to SGW 220 whether or not it is interested in receiving such information.

Consequently, in the absence of the systems and techniques described herein, signaling overhead may be significantly higher due to 1) SGW 220 being required to transmit a separate MBR Rsp. for each PDN associated with the UE (e.g., at step 4 of the example call flow 200), and 2) SGW 220 being required to always generate and transmit a Modify Bearer Req. to the PGW 240 for each PDN associated with the UE (e.g., such as the Modify Bearer Req. shown at steps 11 and 12 of the example call flow 200).

At steps 2 and 3, SGW 220 can generate and transmit an Sx Mod Req. message for all of the PDNs (e.g., PDN1 and PDN2) associated with the UE, wherein the Sx Mod Req. message can be used to update an eNodeB TEID at the same time (e.g., as indicated in FIG. 2 at 254).

In particular, as illustrated in the example call flow 200 of FIG. 2, at step 2 the SGW 220 can generate and transmit a first Sx Mod Req message for PDN1 and a second Sx Mod Req message for PDN2, with both of the Sx Mod Req messages being transmitted to the user plane 230.

The Sx Mod Req messages can be used to provide the updated ULI (e.g., CurrentULI=ULI1>CurrentULI=ULI2) to the user plane 230. The user plane 230 can store the updated ULI and/or use the updated ULI locally, for example to implement one or more ULI-based triggers and/or Charging Data Record (CDR)-based triggers from a PCRF or other network charging function. In some aspects, the user plane 230 can store and/or use the updated ULI2 to update a User Plane Function (UPF), which can include a converged SGW-U and PGW-U (e.g., a collapsed call on user plane session, or other scenario in which the SGW-U and PGW-U are collapsed into a single user plane session). The converged or collapsed SGW-U of the UPF can share the updated ULI or other subscriber information to the PGW-U included in the same UPF, such that PGW-U can utilize the updated ULI to implement one or more location-based services, such as EDR, TO, etc.

At step 3, the user plane 230 can generate and transmit a first Sx Mod Rsp for PDN1 and a second Sx Mod Rsp for PDN2, wherein both Sx Mod Rsp messages are transmitted from the user plane 230 to the SGW 220 to acknowledge the receipt of the updated ULI information (e.g., ULI2) in the first and second Sx Mod Req messages transmitted by the SGW 220 in step 2.

At step 4, the SGW 220 can generate and transmit a single Advance MABR Rsp to MME 210, wherein the single Advance MABR Rsp message is associated with each PDN of the UE. In other words, rather than transmitting an MBR Rsp message individually for each PDN associated with the UE (e.g., a first MBR Rsp for PDN1 and a second MBR Rsp for PDN2), based on the fact that the Advance MABR Req message was used in step 1 to negotiate Advance MABR support between the MME 210 and the SGW 220, the SGW 220 can instead utilize the single MABR message that corresponds to both PDN1 and PDN2.

Note that with the Advance MABR support negotiated in step 1 (e.g., via the Advance MABR Req message), the SGW 220 may determine whether the PGW 240 is interested in receiving updated ULI signaling (e.g., the S5 interface). For example, SGW 220 can check to determine whether or not a flag has been enabled indicating that the PGW 240 is interested in receiving updated ULI signaling that is received at SGW 220 from MME 210. In some embodiments, PGW 240 can use a flag to indicate to SGW 220 that PGW 240 should receive updated ULI information from SGW 220 (e.g., updated ULI information should be forwarded by SGW 220 to PGW 240 whenever SGW 220 receives updated ULI information from MME 210). In some aspects, PGW 240 can negotiate the receipt of ULI updates from SGW 220 on a per-PDN basis. For example, PGW 240 could negotiate the receipt of ULI updates from SGW 220 for PDN1 but not for PDN2, or vice versa, etc.

As will be described in greater depth below, an example of a negotiation between PGW 240 and SGW 220 for the receipt of updated ULI at PGW 240 (e.g., from SGW 220) is depicted at 256, and in steps 5 and 6. With respect to steps 2-4 described above, however, it is noted that the example call flow 200 depicts a scenario in which the enable flag for receipt of updated ULI from SGW 220 has not been set or otherwise negotiated between PGW 240 and SGW 220. Accordingly, as depicted in example call flow 200, SGW 220 does not forward the updated ULI information (e.g., CurrentULI=ULI2) to PGW 240 upon receipt of the updated ULI information from MME 210, because the PGW 240 has not requested updated ULI information for either of the PDNs associated with the UE (e.g., PDN1 and PDN2).

At step 5, the PGW 240 can generate and transmit an Update Bearer Request message to SGW 220 (e.g., depicted in FIG. 2 as an 'Update Bearer Req'). In one illustrative example, the Update Bearer Req message can be generated as a request for SGW 220 to enable ULI and/or ULI updates for PGW 240. For example, the Update Bearer Req message can indicate that PGW 240 wishes to receive current and/or updated ULI information from SGW 220. In some embodiments, the Update Bearer Req message can be transmitted on a per-PDN basis or can be transmitted as a single message for all PDNs. In some examples, the PGW 240 can transmit the Update Bearer Req message to enable ULI (or to negotiate the enabling of ULI updates from SGW 220) by using or otherwise including an Indication IE flag. For example, a first value of the Indication IE flag could indicate a request from the PGW 240 to receive ULI updates from SGW 220. In some aspects, any value of the Indication IE flag could indicate a request from PGW 240 to receive ULI updates from SGW 220 (e.g., wherein the lack of a value of the Indication IE flag/the lack of an Indication IE flag indicated at SGW 220 informs the SGW 220 that PGW 240 has not requested ULI updates).

In some examples, PGW 240 may request or otherwise negotiate the transmission or forwarding of updated ULI information from SGW 220 based at least in part on a new use case being enabled at the PGW 240, wherein the newly enabled use case requires the latest ULI updates. For instance, as depicted in the example call flow 200 at 256, PGW 240 may negotiate ULI updates from SGW 220 using the Indication IE flag in response to a location-based service such as Lawful Interception (LI) being enabled at the PGW 240.

At step 6, SGW 220 can generate and transmit an Update Bearer Rsp message to PGW 240, e.g., in response to SGW 220 successfully receiving the Update Bearer Req-Enable ULI message from PGW 240 in step 5. In some embodiments, the SGW 220 can generate and transmit the Update Bearer Rsp message to include the current ULI, which in this example is ULI2 (e.g., recalling that SGW 220 received ULI2 from MME 210 in step 1, and may store a local copy of ULI2).

In one illustrative example, the current ULI (e.g., CurrentULI) can again be changed, e.g., from CurrentULI=ULI2>CurrentULI=ULI3. For example, as depicted in FIG. 2 at block 257, the ULI change/update can occur due to an inter eNodeB handover causing the CurrentULI to change from ULI2 to ULI3. In some aspects, the UE location change to ULI3 can be determined or otherwise obtained at MME 210.

At step 7, in response to detecting the UE location change to ULI3 (e.g., due to the inter eNodeB handover at block 257), MME 210 can generate and transmit an Advance MABR message including the updated ULI3. As illustrated in FIG. 2, MME 210 can generate and transmit the Advance MABR message to SGW 220, wherein the Advance MABR message is provided as a single message associated with all of the PDNs of the UE (e.g., PDN1 and PDN2). In some aspects, because Advance MABR support was already negotiated between MME 210 and SGW 220 at step 1, negotiation may not need to occur again at step 7. In some examples, Advance MABR support can again be negotiated between MME 210 and SGW 220 for the transmission of the updated ULI3.

Steps 8 and 9 can be the same as or similar to steps 2 and 3 described above, with steps 8 and 9 being associated with the updated ULI3 instead of the ULI2 associated with steps 2 and 3. In steps 8 and 9, SGW 220 can transmit the updated ULI3 to the user plane 230 for one of (or both) PDN1 and PDN1, and can receive a confirmation message in response from user plane 230 (e.g., as also described above with respect to steps 2 and 3).

At step 10, SGW 220 can generate and transmit to MME 210 and Advance MABR Rsp message associated with PDN1 and PDN2 (e.g., the same as or similar to the Advance MABR Rsp described at step 4, with respect to the updated ULI2 rather than the updated ULI3 associated with step 10).

Subsequently, however, SGW 220 can transmit the updated ULI3 to PGW 240 (e.g., in addition to transmitting updated ULI3 to the user plane 230 in the preceding steps 8-10). For example, SGW 220 can transmit the ULI update (e.g., ULI3) to PGW 240 based on PGW 240 negotiating/enabling ULI updates from SGW 220 using the Indication IE flag at step 5.

Accordingly, SGW 220 can use the negotiated ULI update procedure to generate and transmit MBR messages with the ULI update (e.g., ULI3) to PGW 240, as indicated at block 258. In some embodiments, SGW 220 can generate and transmit MBR messages that include ULI3 on a selective, per-PDN basis. For instance, SGW 220 can generate and transmit an MBR message only for the particular PDNs for which PGW 240 has previously requested ULI updates. In one illustrative example, SGW 220 can generate and transmit an MBR message with ULI3 for PDN1 in response to receiving (e.g., from PGW 240 at step 5) the Indication IE flag for PDN1. If SGW 220 determines that it has not received the Indication IE flag set for PDN2, then an MBR message is not transmitted for PDN2.

As illustrated, SGW 220 can selectively generate and transmit one or more MBR messages with the ULI3 update on a per-PDN basis at step 11. For example, the depicted 'Modify Bearer Req (ULI3)' can be generated and transmitted on a per-PDN basis. In some embodiments, the negotiation of ULI/CSG/TZ interest (e.g., on, at or by PGW 240) can be performed using the S5 interface. In some cases, the negotiated ULI/CSG/TZ information can be forwarded from SGW 220 to PGW 240 on S5 interfaces on a per-PDN basis.

At step 12, SGW 220 can receive one or more Modify Bearer Resp messages from PGW 240, e.g., acknowledging the receipt of MBR with the ULI3 update in step 11.

Accordingly, aspects of the present disclosure can be used to reduce signaling overhead in various scenarios, including scenarios such as selective location updates to a PGW, location updates triggered by a 5G NSA device, and various other scenarios in which existing MABR approaches may be incompatible or inefficient. In some embodiments, the systems and techniques described herein can be used to reduce signaling on one or more of the S11 interface, the S5/S8 interface, etc., while also reducing resource utilization at the MME, SGW, and PGW—for example, by reducing signaling to the MME, SGW, and/or PGW, resource utilization can be reduced based at least in part on processing (and/or responding to) fewer messages at the MME, SGW, and PGW.

Figure 3:
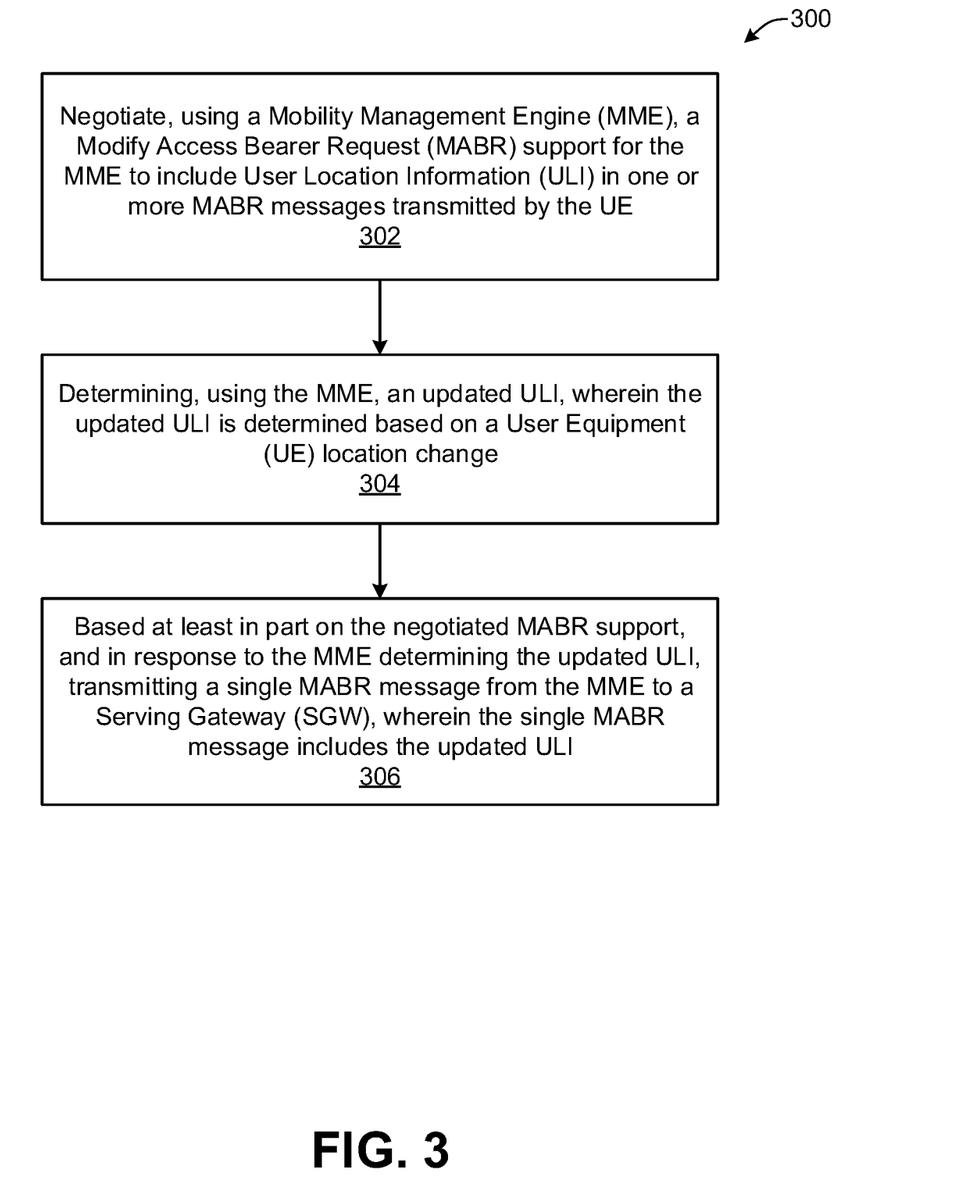
FIG. 3 illustrates a flowchart of an example method for signaling optimization for MABR messaging, in accordance with some embodiments of the present disclosure.

FIG. 3 illustrates a flowchart of an example method 300 for improved signaling of subscriber information and updates thereto for one or more location-based user plane services, according to some aspects of the present disclosure. It is understood that example method 300 of FIG. 3 can also be implemented using one or more processors and memories having computer-readable instructions stored thereon, which when executed by the one or more processors cause the one or more processors to perform operations including some or all of the steps of example method 300. Although example method 300 depicts a particular sequence of operations, the sequence may be altered without departing from the scope of the present disclosure. For example, some of the operations depicted may be performed in parallel or in a different sequence that does not materially affect the function of example method 300. In other examples, different components of an example device or system that implements example method 300 may perform functions at substantially the same time or in a specific sequence.

According to some embodiments, at step 302 the method 300 includes negotiating, using a Mobility Management Engine (MME), a Modify Access Bearer Request (MABR) support for the MME to include User Location Information (ULI) in one or more MABR messages transmitted by the MME. For example, the MME can be the same as or similar to the MME 112 illustrated in FIGS. 1A and 1B.

In some embodiments, the negotiated MABR support can be negotiated between the MME and an SGW, such as the SGW-C 118 and/or SGW-Us illustrated in FIGS. 1A and 1B. In some examples, the SGW and the MME can be included in a same wireless network. For example, the SGW and the MME can be included in a 5G Non-Standalone (NSA) network, such a 5G NSA cellular or wireless network. The 5G NSA network can include a 4G/LTE Evolved Packet Core (EPC) and a 5G Radio Access Network (RAN). In some aspects, a User Equipment (UE) location change can occur in association with a handover from the UE connecting to a 4G eNB to the UE subsequently connecting to a 5G gNB. In some embodiments, the location change from the eNB location to the gNB location can be associated with the updated ULI. For example, the eNB location can be a first location associated with the ULI and the gNB location can be a second location associated with the updated ULI.

In some aspects, the MME can generate and transmit a single MABR message to the SGW, wherein the single MABR message includes the ULI or the updated ULI. In some examples, the single MABR message can be associated with two or more Packet Data Networks (PDNs). For example, the single MABR message can be associated with the first PDN (e.g., PDN1) and the second PDN (e.g., PDN2) illustrated in FIG. 2. In some embodiments, the first PDN can be a data network such as the Internet and the second PDN can be an IMS, MMS, etc. In some cases, a UE (and therefore, the single MABR message generated and transmitted by the MME to the SGW) can be associated with two or more PDNs.

At step 304, the method 300 includes determining, using the MME, an updated ULI, wherein the updated ULI is determined based on a User Equipment (UE) location change. For example, the UE can be the same as or similar to the UE 102 illustrated in FIGS. 1A and 1B. In some embodiments, the updated ULI can be determined based on or otherwise associated with a location change of a 5G NSA UE. For example, the UE location change (and therefore, the updated ULI) can be determined based on the 5G NSA UE first establishing an active data connection with the location of a 4G eNB before subsequently transferring the connection to the location of a 5G gNB, as mentioned above. In such scenarios, the ULI and the updated ULI can be associated with the 5G NSA UE.

In some embodiments, the updated ULI can be determined based on a UE location change associated with a UE state change between idle and active. For example, the UE location change can be an idle-active movement or an active-idle movement, etc. The UE state change (e.g., idle-active movement and vice versa) can be associated with one or more PDNs and/or bearers associated with respective ones of the one or more PDNs. In some examples, the UE location change can be associated with an inter-eNodeB handover, and X2/S1 handover without SGW relocation, etc.

At step 306, the method 300 includes transmitting, based at least in part on the negotiated MABR support and in response to the MME determining the update ULI, a single MABR message from the MME to a Serving Gateway (SGW), wherein the single MABR message includes the updated ULI. For example, the SGW can be the same as or similar to one or more of the SGW-C 118 and/or SGW-Us illustrated in FIGS. 1A and 1B. In some examples, the SGW can store and/or utilize the updated ULI locally. In some aspects, the SGW can transmit or forward the updated ULI to a PGW. For example, the method 300 can further include determining a negotiated ULI interest associated with the PGW. In response to determining that the negotiated ULI interest exists for the PGW, the SGW can forward the updated ULI to the PGW by using one or more Modify Bearer Request (MBR) messages. In some embodiments, the negotiated ULI interest (e.g., negotiated between the SGW and the PGW) can be determined based on an Indication Information Element (IE) flag associated with the PGW. For example, the PGW can request ULI information from the SGW based at least in part on the inclusion of the Indication IE flag in an Update Bearer Request message transmitted from the PGW to the SGW. In some aspects, the PGW can request (e.g., negotiate) ULI information from the SGW selectively, for example on a per-PDN basis.

Figure 4:
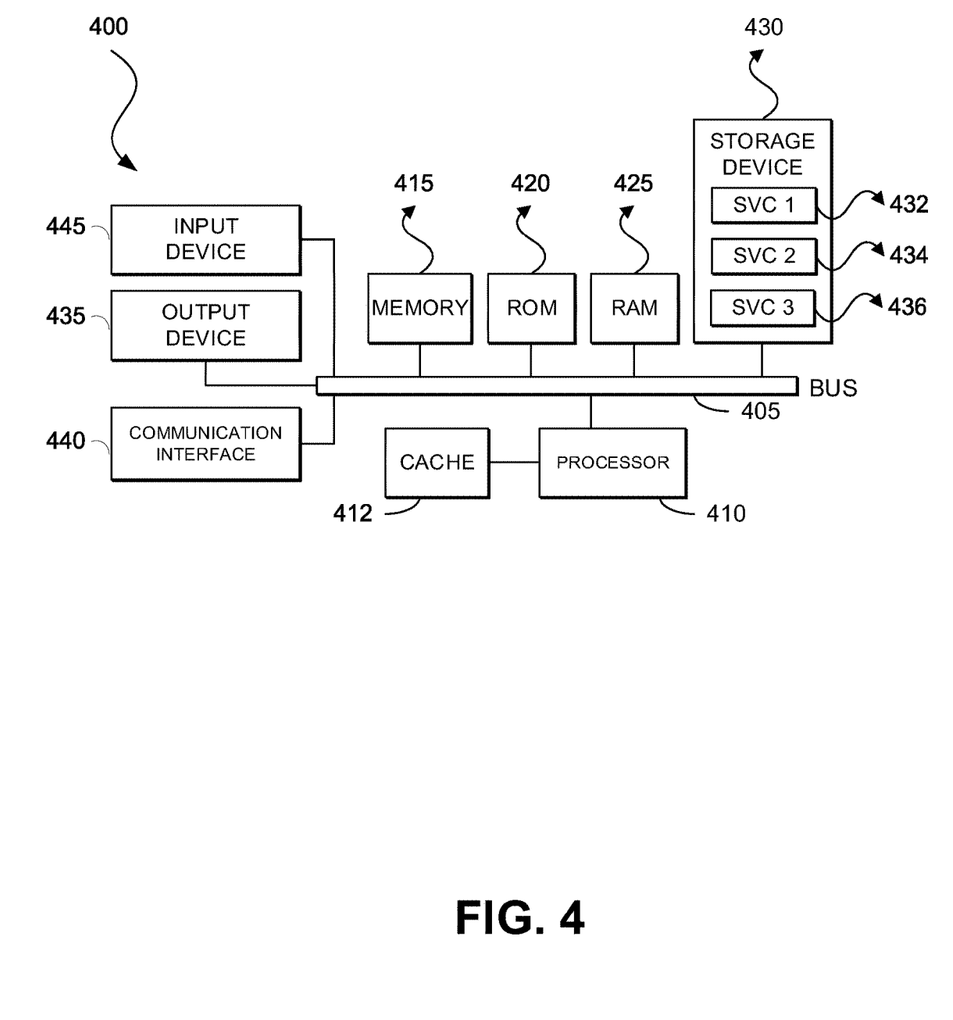
FIG. 4 illustrates an example system for implementing certain aspects of the present technology, in accordance with some embodiments of the present disclosure.

FIG. 4 illustrates a computing system architecture, according to some aspects of the present disclosure. Components of computing system architecture 400 are in electrical communication with each other using a connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random-access memory (RAM) 425 to processor 410. Computing system 400 can include a cache of high-speed memory 412 connected directly with, in close proximity to, or integrated as part of processor 410.

Processor 410 can include any general-purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
performing feature negotiation between a Mobility Management Engine (MME) and a Serving Gateway (SGW) to determine a negotiated feature corresponding to Modify Access Bearer Request (MABR) messages transmitted by the MME, wherein presence of the negotiated feature is indicative of support for the MME to include subscriber information corresponding to a User Equipment (UE) location in MABR messages transmitted by the MME as respective single MABR messages each associated with a plurality of Packet Data Networks (PDNs) of the UE;
determining, using the MME, an updated subscriber information, wherein the updated subscriber information is determined based on a (UE) a UE location change; and
based at least in part on the negotiated feature indicating MABR support, and in response to the MME determining the updated subscriber information, transmitting a single MABR message from the MME to, the SGW, wherein the single MABR message includes the updated subscriber information for the plurality of PDNs.

2. The method of claim 1, further comprising:
determining a negotiated subscriber information interest associated with a Packet Gateway (PGW); and
in response to determining that the negotiated subscriber information interest exists, forwarding the updated subscriber information from the SGW to the PGW using one or more Modify Bearer Request (MBR) messages.

3. The method of claim 2, wherein the negotiated subscriber information interest associated with the PGW is determined for each respective PDNs of two or more PDNs associated with the PGW.

4. The method of claim 2, wherein the negotiated subscriber information interest is determined based on an Indication Information Element (IE) flag associated with the PGW.

5. The method of claim 4, wherein the negotiated subscriber information interest is negotiated between the SGW and the PGW, based at least in part on the inclusion of the Indication IE flag in an Update Bearer Request message.

6. The method of claim 1, wherein the negotiated feature indicating MABR support is negotiated between the MME and the SGW, the SGW and the MME included in a same wireless network.

7. The method of claim 6, wherein the MME includes the subscriber information in the single MABR message transmitted to the SGW, wherein the single MABR message is associated with two or more Packet Data Networks (PDNs).

8. The method of claim 7, wherein the SGW and the MME are included in a 5G Non-Standalone (NSA) network, the 5G NSA network including a fourth-generation (4G) Evolved Packet Core (EPC) and a fifth-generation (5G) Radio Access Network (RAN).

9. The method of claim 7, wherein the subscriber information and the updated subscriber information are associated with a 5G NSA User Equipment (UE), and include one or more of User Location Information (ULI), UE Time Zone (TZ) information, Closed Subscriber Group (CSG) information, or presence reporting area information.

10. The method of claim 1, wherein the updated subscriber information is determined based on a UE location change associated with a UE state change between idle and active or a UE location change associated with an inter-eNodeB handover.

11. A system comprising:
one or more processors; and
at least one computer-readable storage medium having instructions stored thereon, wherein the instructions, when executed by the one or more processors, are effective to cause the one or more processors to:
perform feature negotiation between a Mobility Management Engine (MME and a Serving Gateway (SGW) to determine a negotiated feature corresponding to Modify Access Bearer Request (MABR) messages transmitted by the MME, wherein presence of the negotiated feature is indicative of support for the MME to include subscriber information corresponding to a User Equipment (UE) location in MABR messages transmitted by the MME as respective single MABR messages each associated with a plurality of Packet Data Networks (PDNs) of the UE;
determine, using the MME, an updated subscriber information, wherein the updated subscriber information is determined based on a UE location change; and
based at least in part on the negotiated feature indicating MABR support, and in response to the MME determining the updated subscriber information, transmit a single MABR message from the MME to, the SGW, wherein the single MABR message includes the updated subscriber information.

12. The system of claim 11, wherein the instructions further cause the one or more processors to:
determine a negotiated subscriber information interest associated with a Packet Gateway (PGW); and
in response to determining that the negotiated subscriber information interest exists, forward the updated subscriber information from the SGW to the PGW using one or more Modify Bearer Request (MBR) messages.

13. The system of claim 12, wherein the negotiated subscriber information interest associated with the PGW is determined for each respective PDN of two or more PDNs associated with the PGW.

14. The system of claim 12, wherein the negotiated subscriber information interest is determined based on an Indication Information Element (IE) flag associated with the PGW.

15. The system of claim 14, wherein the negotiated subscriber information interest is negotiated between the SGW and the PGW, based at least in part on the inclusion of the Indication IE flag in an Update Bearer Request message.

16. The system of claim 11, wherein the negotiated feature indicating MABR support is negotiated between the MME and the SGW, the SGW and the MME included in a same wireless network.

17. The system of claim 16, wherein the MME includes the subscriber information in the single MABR message transmitted to the SGW, wherein the single MABR message is associated with two or more Packet Data Networks (PDNs).

18. The system of claim 17, wherein the SGW and the MME are included in a 5G Non-Standalone (NSA) network, the 5G NSA network including a fourth-generation (4G) Evolved Packet Core (EPC) and a fifth-generation (5G) Radio Access Network (RAN).

19. The system of claim 17, wherein the subscriber information and the updated subscriber information are associated with a 5G NSA User Equipment (UE), and include one or more of User Location Information (ULI), UE Time Zone (TZ) information, Closed Subscriber Group (CSG) information, or presence reporting area information.

20. The system of claim 11, wherein the updated subscriber information is determined based on a UE location change associated with a UE state change between idle and active or a UE location change associated with an inter-eNodeB handover.

* * * * *